United States Patent [19]

Kristiansson

[11] Patent Number: 5,614,789
[45] Date of Patent: *Mar. 25, 1997

[54] APPARATUS AND METHOD OF REDUCING VARYING ELECTRICAL FIELDS IN VIDEO DISPLAY TERMINALS

[76] Inventor: Robert Kristiansson, Hammavägen 47, S-175 35 Järfälla, Sweden

[ * ] Notice: The term of this patent shall not extend beyond the expiration date of Pat. No. 5,449,975.

[21] Appl. No.: 244,400

[22] PCT Filed: Nov. 19, 1992

[86] PCT No.: PCT/SE92/00794

§ 371 Date: Jun. 29, 1994

§ 102(e) Date: Jun. 29, 1994

[87] PCT Pub. No.: WO93/10537

PCT Pub. Date: May 27, 1993

[30] Foreign Application Priority Data

Nov. 22, 1991 [SE] Sweden ................... 9103469

[51] Int. Cl.$^6$ ............................................. H01J 5/02
[52] U.S. Cl. ............................... 315/85; 315/8; 315/370; 313/479; 361/159; 335/214
[58] Field of Search ............................ 313/414, 437, 313/449, 479; 315/85, 8, 1, 3, 370, 411; 361/159; 335/214

[56] References Cited

U.S. PATENT DOCUMENTS

| | | | |
|---|---|---|---|
| 5,151,635 | 9/1992 | Cappels | 315/370 |
| 5,218,270 | 6/1993 | Haapakoski | 315/85 |
| 5,243,262 | 9/1993 | Moen | 315/370 |
| 5,449,975 | 9/1995 | Madsen | 315/85 |

FOREIGN PATENT DOCUMENTS

| | | |
|---|---|---|
| 0272234 | 6/1988 | European Pat. Off. . |
| 0498589 | 8/1992 | European Pat. Off. . |
| WO86/01910 | 3/1986 | WIPO . |
| WO89/03631 | 4/1989 | WIPO . |

*Primary Examiner*—Robert Pascal
*Assistant Examiner*—Arnold Kinkead

[57] ABSTRACT

The present invention is concerned with a method and an arrangement relating to visual display units, preferably a picture tube (1), for reducing to a minimum the electrical alternating fields generated by the display unit in the unit surroundings. The visual display unit is provided with a voltage connected part (5) on which undesirable voltage variations occur. These voltage variations are indicated. A signal which is phase inverted in relation to the indicated voltage variations is generated. The generated phase-inverted signal is fed back to the voltage connected part (5), to compensate for the voltage variations.

8 Claims, 2 Drawing Sheets

APPARATUS AND METHOD OF REDUCING VARYING ELECTRICAL FIELDS IN VIDEO DISPLAY TERMINALS

The present invention relates to an arrangement of the kind defined in the preamble of claim 1.

TECHNICAL FIELD

The hazards of working in front of video display units have been discussed in the 1980s. As a result of these discussions, it is now a standard requirement that emissions of various kinds, such as magnetic fields, electrical fields, etc., shall be held at the lowest possible level.

The discussions have resulted in methods for voluntarily testing video screens. As from 1987, there has been a strong commercial demand to fulfil certain recommended measurement values in conjunction with the recommended measuring method. In certain instances, it is necessary to fulfil still more stringent, customer-specific requirements. The ability to show comparatively low measurement values in these voluntary tests has given a competitive edge to retailers. The revised methods for voluntarily testing video display units have included testing for electrical alternating fields. These fields are often measured in two frequency bands, band I (5 Hz–2kHz) and band II (2 kHz–400 kHz).

BACKGROUND ART

The electrical alternating fields deriving from a video display unit, primarily a CRT-type unit (cathode ray tube-unit) are generated by a number of different electrical components included in the unit. It is a relatively easy matter to screen the electrical alternating fields in all directions with the exception of the forward direction immediately in front of the screen, for instance with the aid of screening plates, electrically conductive outer casings or housings, or with the aid of electrically conductive layers or coatings on a plastic outer casing. The electrical alternating field extending forwardly from the screen surface of a CRT-type video display unit is caused by variations in the acceleration voltage applied inwardly of the front glass of the video display unit.

One method of dealing with the effect of, among other things, the electrical alternating fields that are generated in front of a display screen involves the use of a transformer in the high voltage part with low internal impedance, although this solution is expensive if the result is to be effective. Another method involves coupling an external capacitor across the acceleration voltage. Although this solution will smooth the acceleration voltage, particularly at the low frequencies that fall within band I, it has been found that the solution is not effective enough to provide satisfactory equalization of the more high-frequency voltage variations found within band II.

Other methods involve the provision of an electrically conductive panel or like device in front of the picture tube. This solution requires a panel of very high conductivity, in order to be able to reduce the alternating fields in both band I and band II. Consequently, such panels are expensive and/or result in impaired synergonomical properties. For instance, the picture becomes out of focus, i.e. blurred, and the light yield is inferior than the light yield of a standard screen, i.e. the panel does not have full light transmission.

The object of the present invention is to achieve with a video display unit, and primarily a CRT-type unit, the smallest possible electrical alternating fields in the surroundings of the picture tube, and particularly in front of the screen of the unit.

Another object of the invention is to compensate for relatively high-frequency voltage ripple on the acceleration voltage of a CRT-type visual display unit, particularly within band II.

SUMMARY OF THE INVENTION

These objects are achieved in accordance with the invention with an arrangement of the kind set forth in claim 1. Other characteristic features of the inventive arrangement and further developments thereof are set forth in the remaining claims.

Thus, the invention relates to a method of reducing to a minimum the electrical alternating fields generated in the surroundings of a visual display unit, such as a picture tube, in which the display unit is provided with a voltage connected or live part, e.g. an electrically conductive coating, on which undesirable signal variations occur. The method comprises the steps of indicating the undesirable voltage variations, generating a signal which is phase-reversed in relation to the indicated voltage variations, and delivering the generated phase-reversed signal to the voltage-connected or live part.

BRIEF DESCRIPTION OF THE DRAWINGS

The invention will now be described in more detail with reference to the accompanying drawings, in which FIG. 1 is a sectional view of a CRT-type picture tube together with a coupling circuit according to one embodiment of the inventive arrangement;

FIG. 2 is an equivalent diagram illustrating the electrical supply circuit for the acceleration voltage in the arrangement;

FIG. 3 is a block schematic of a first embodiment of the current generator illustrated in FIGS. 1 and 2.

DESCRIPTION OF THE PREFERRED EMBODIMENTS

Figures 1, 2, 3:
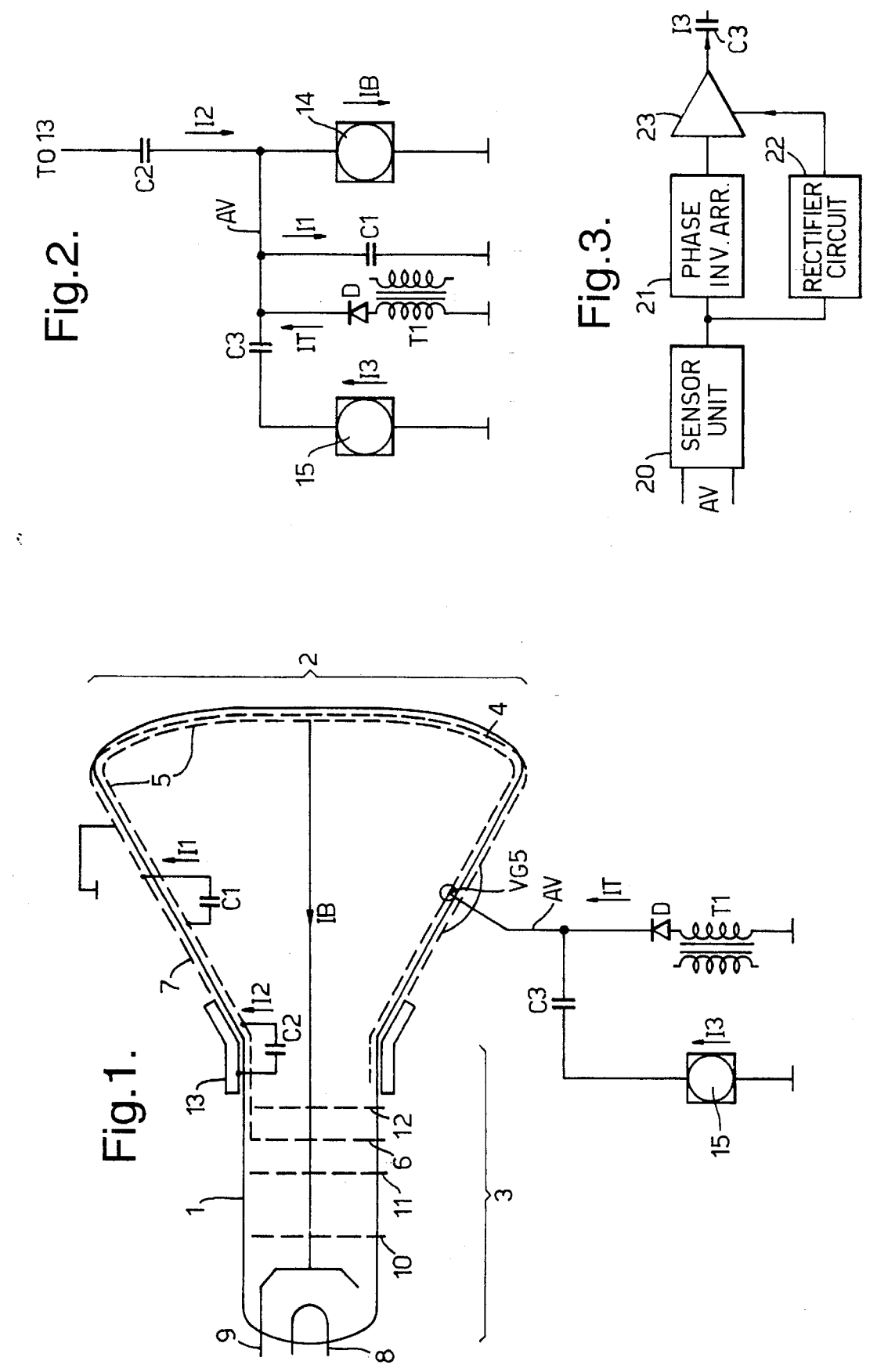
Figure 4:
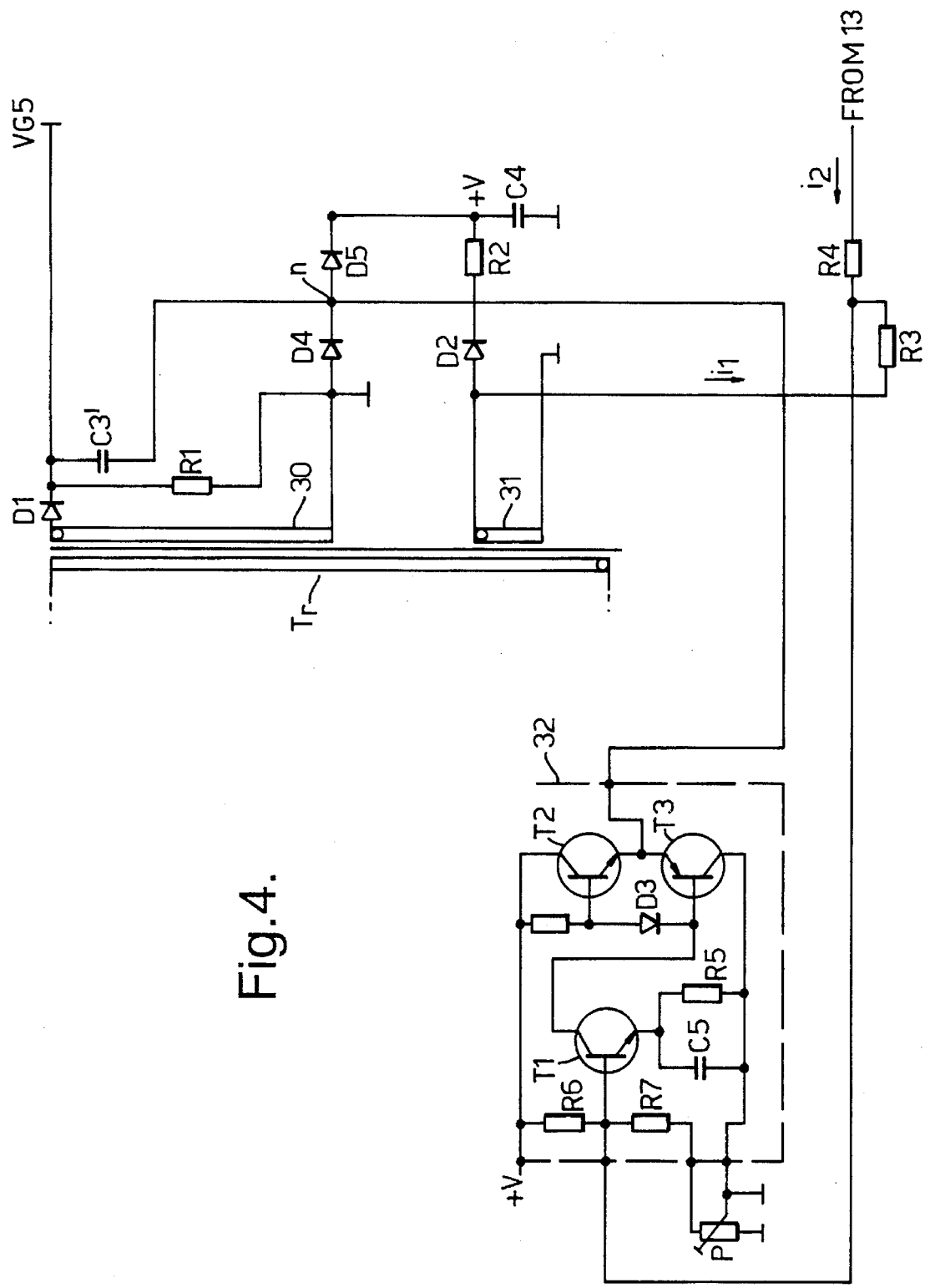
FIG. 4 is a circuit diagram of a second embodiment of the current generator illustrated in FIGS. 1 and 2.

The picture tube illustrated in FIG. 1 comprises a glass outer casing 1. The glass casing has a picture tube face 2 which is generally flat and rectangular in the direction facing forwards towards a viewer. The tube narrows rearwardly and terminates in a tubular part 3, referred to as the tube neck.

The inner surface of the front face 2 of the tube is coated with a layer 4 of fluorescent salts. A thin aluminium layer 5, which is both reflective and electrically conductive, is applied to the inner surface of the outer casing 1, inwardly of the fluorescent layer 4 at the front of the tube and directly against the casing surface on the narrowing part of the casing between the tube neck 3 and the tube front 2 and also over a short distance on the inner surface of the tube neck 3, and is connected electrically to the acceleration electrode 6 of the picture tube. An electrically conductive carbon layer 7 is applied on the outer surface of the outer casing 1, between the tube neck 3 and the tube front 2.

The neck 3 of the picture tube, or cathode-ray tube, contains an electron gun, a heating filament 8, a cathode 9 which is heated by the heating filament, an acceleration electrode 6 and control grids 10, 11, 12. Electrons can be permitted to pass through the grids in the electron gun and are accelerated by the acceleration voltage applied to the acceleration electrode and the layer 5, to impinge on the fluorescent layer 5 on the front 2 of the picture tube 1. As the electrons impinge on the fluorescent salt layer 4, light is emitted from the layer.

A deflecting coil package 13 is mounted around the neck of the tube. This coil pack includes two pairs of windings and a magnetic field which is variable in two mutually opposed perpendicular directions can be generated with the aid of these windings and by controlling the windings in an appropriate manner. The electrons are deflected as they pass through this magnetic field. The point of impact of the electrons on the front face of the picture tube is controlled with the aid of the deflecting coil pack, and therewith also where light is generated on the front of the tube.

When the picture tube is switched-on, an acceleration voltage is applied between the aluminium layer 5 and the cathode 9. The carbon layer 7 is connected to 0 V, i.e. ground potential. The acceleration voltage between cathode and acceleration electrode is coupled to the acceleration electrode side on one side of the picture tube in a separate contact VG5, which is connected to the aluminium layer 5 and normally reaches to between 12 kV and 30 kV, depending upon application. The layers 5 and 7 thereby form a capacitance C1, which is charged to the acceleration voltage and which forms an energy reservoir.

The electrons leaving the electron gun and impinging on the fluorescent layer 7 result in the flow of electric current IB from the aluminium layer 5 to the electron gun cathode 9. This has been indicated as a current generator 14 in FIG. 2. A current I1 is also conducted through the capacitance C1 formed between the layers 5 and 7, meaning that the current IB will take energy from the capacitance C1 and therewith discharge the same.

The technique described above is quite conventional. In normal video screen applications, the acceleration voltage is generated by the secondary winding of a transformer T1. This delivers energy to the capacitance C1, normally in the form of current pulses IT at acceleration voltage. The capacitance C1 is relatively large, and thereby functions as a smoothing capacitor which holds the acceleration voltage at an approximately constant level.

A diode D coupled in series with the transformer T1 ensures that current is able to flow in only one direction. Nevertheless, variations in the acceleration voltage to the picture tube will still occur, due to internal impedance in the transformer T1 and to load variations caused by variations in the beam current in the picture tube.

This voltage variation contributes to the generation of electrical alternating fields in front of the picture tube, particularly within band I, i.e. within the frequency range of 5 Hz–2kHz. Although this can be alleviated partially by using a transformer T1 of relatively low internal impedance, it is usual, however, to also connect an external capacitor over the acceleration voltage, i.e. in practice parallel with the capacitance C1, so as to further smooth the acceleration voltage.

However, there is another factor which contributes greatly to variations in the acceleration voltage. The deflection coil pack is formed along the picture tube and the coil pair seated nearest the tube obtains a capacitive coupling C2 to the aluminium layer 5 within the tube 1 on the inside of the casing. This coil pair is comprised of the so-called line deflecting coils which are operated at high voltages (a top voltage of 1 kV is not unusual) and at frequencies of between 15 kHz and 100 kHz, i.e. within band II. A current I2 will flow from these coils to the aluminium layer 5.

As a result of this contribution, the voltage variation on the acceleration voltage becomes so pronounced as to render it impossible in practice to compensate for the variation with the aid of solely one external capacitor.

The disturbance occurring as a result of this variation will, in turn, contribute to the electrical alternating fields in front of the picture tube within band II, i.e. within the frequency range of 2 kHz–400 kHz.

In accordance with the present invention, the voltage ripple on the acceleration voltage of the picture tube is compensated for, or balanced out, by supplying a compensating alternating current I3 to the aluminium layer 5 via a coupling capacitor C3, or alternatively directly to the acceleration electrode 6. In this way, a ripple compensation voltage is superimposed on the acceleration voltage. The compensation current I3 is therewith added to the aforesaid current IB flowing between the aluminium layer 5 and the cathode 9 (or the carbon layer 7). This compensation current is adjusted so as to become equal to but phase-reversed in comparison with the disturbance currents within the frequency band II, which cause the voltage variations on the acceleration voltage. This results in a reduction in the electrical alternating fields in front of the picture tube screen.

The compensation current I3 is generated by a voltage or current generator 15. This can have many different forms. One embodiment of a current generator is illustrated in FIG. 3. The acceleration voltage AV is applied over the input of a sensor unit 20. This unit may be adapted for band II, but may also be broader. The output signal from the sensor unit 20 is fed to the input of a phase inverter arrangement 21 which reverses the phase of the signal from the unit 20. The phase inverter arrangement 21 may optionally include a plurality of parallel units, each being intended to reverse the phase of a respective frequency part in the incoming signal. The output signal from the sensor unit 20 is also delivered to a rectifier circuit 22. The output of the rectifier circuit 22 has a signal which gives the size of the ripple. The output of the phase inverter arrangement 21 is coupled to the signal input of a controllable amplifier 23 which has the current I3 on its output. The output of the rectifier circuit is coupled to the control input of the amplifier 23 so as to servo-adjust the amplifier 23 to an appropriate signal strength I3.

FIG. 4 illustrates a much simpler kind of compensation circuit. The circuit is included as a part of the picture tube control circuits, not shown. The acceleration voltage is obtained across a secondary winding 30 of a high voltage transformer Tr. The secondary winding 30 is connected between earth and the electrical contact VG5, through the intermediary of a diode D1, so that the coating 5 and the acceleration electrode 6 will only be charged by voltage pulses which exceed the acceleration voltage and avoid discharge through the winding 30. A high-ohmic protective resistor R1 is coupled between earth and the electrical contact VG5.

Voltage variations on the acceleration voltage are not detected directly, but across a secondary winding 31 which has a much lower voltage and which can be handled readily. One end of the secondary winding 31 is connected to earth and the other end is connected to earth through a diode D2, a resistor R2, and a large capacitor C4. This coupling is a rectifying stage which generates a drive voltage +V across the capacitor C4, which functions as a smoothing capacitor. This direct current voltage +V is coupled as a drive voltage source for a phase inverter stage 32.

The coupling point between the secondary winding 31 and the diode D2 is connected to the input of a phase inverter stage 32, via a resistor R3. This produces a first input signal $i_1$. The deflection coil pack 13 is also supplied from the high voltage transformer (not shown). Consequently, a second current $i_2$ is also fed from the deflection coil pack 13 to the input of the phase inverter stage 32, via a resistor R4, and is added to the current $i_1$ in an appropriate proportion.

The phase inverter stage 32 includes a first NPN-transistor T1, which is common-emitter coupled and the emitter of which is connected to earth via a capacitor C5 and a resistor R5 connected in parallel. This parallel coupling functions as a high-pass filter and the transistor T1 functions as a phase inverter. The circuit in FIG. 4 does not include means for servo-controlling signal level, and instead the signal level is adjusted with a potentiometer P mounted in the branch between the base of the transistor T1 and earth by the voltage dividing coupling having the resistors R6 and R7, P coupled to the base of the transistor T1 so as to maintain the base at an appropriate working point. In practice, those disturbance voltages to be compensated for have a relatively stable size and a fixed adjustment of this kind can therefore suffice.

The collector of the transistor T1 is coupled to the input of an amplifier and buffer stage which comprises an NPN-transistor T2 and a PNP-transistor T3 with mutually coupled emitters and with their collector/emitter paths connected in series and coupled between the drive voltage source +V and earth. The collector of the transistor T1 is connected to the base of the transistor T3 and also, via a diode D3, to the base of the transistor T2 and in series with the diode D3 to the drive voltage source +V. The output of the phase inverter stage 32 between the emitters of the transistors T2 and T3 is coupled to a node n between two diodes D4 and D5 which are coupled in their inverse direction between earth and the drive voltage +V. The node is coupled to the electrical contact VG5 via the capacitor C3' which corresponds to the capacitor C3 in FIGS. 1 and 2.

Practical laboratory tests of the invention carried out with the circuit solution illustrated in FIG. 4 have shown that the electrical alternating fields for band II (2–400 Khz) can be reduced to about 1/30 of the original value. It was also found that the electrical alternating fields within band I (5 Hz–2kHz) were reduced at the same time, due to the presence of the coupling capacitor C3', which functions purely as a decoupling capacitor in this frequency range. Consequently, it was not necessary to use an extra decoupling capacitor.

Comparison tests have been carried out on a 15" monochrome monitor and the results obtained are given in the following Table. The subject measured were the high frequency alternating fields within band II immediately in front of the picture screen, at a distance of 30 cm from the screen. The values first presented in the Table are those that were obtained originally, i.e. when no measures at all were taken to reduce the electric alternating fields. The values obtained when using solely one external capacitor having the capacitance 3 nF coupled between the aluminium layer 5 and the carbon layer 7 are presented next. The third set of values presented are those obtained when mounting a panel in front of the picture screen. In this case, the panel used was of the so-called OCLI-type, i.e. the panel was made of glass and had a conductive layer on one side thereof and had been anti-reflex treated on its other side. The values obtained when compensating in accordance with the invention are presented last.

| Measuring Result | |
|---|---|
| Original values | 17 V/m |
| Capacitor 3 nF | 5.5 V/m |
| With panel | 0.4 V/m |
| When compensating according to the invention | 0.6 V/m |

The recommended limit value is 2.5 V/m measured at a distance of 50 cm, and it will be seen from the above Table that a value well below this limit value is obtained when practicing the inventive method.

It will be understood that the invention is not restricted to this type of video display unit or to the aforedescribed materials in its coatings. The essential feature resides in compensating for voltage variations which occur with a video display unit and which give rise to electrical alternating fields in front of said unit by measuring the voltage variation and by generating a phase inverted voltage-variation signal and feeding said signal back in order to compensate for the voltage variations and therewith reduce the electrical alternating field to a minimum.

I claim:

1. A method for reducing electrical alternating fields generated by a CRT unit in the surroundings of the unit to a minimum, said CRT unit being provided with a voltage conducting layer on which undesirable signal variations occur, comprising:

indicating the undesirable signal variations of the acceleration voltage of the CRT unit, and phase inverting the indicated signal variations, characterized by feeding the generated phase inverted, varying signal directly to the voltage conducting layer.

2. A method according to claim 1, characterized by indicating the signal variations of the voltage conducting layer within a frequency band having a pre-selected bottom limit frequency.

3. A method according to claim 1, including detecting the signal strength of the indicated signal variation, and servo-adjusting the signal strength of the signal bed to the voltage conducting layer with the aid of the detected signal strength.

4. A method according to claim 1, in which the signal strength of the indicated signal variation is fixed but is manually adjustable in the phase inverting process, and that the amplitude of the generated phase inverted signal is controlled by the manually adjusted signal strength.

5. An arrangement for reducing electrical alternating fields generated in the surroundings of a CRT unit to a minimum, said CRT unit being provided with a voltage conducting layer on which undesirable signal variations occur, comprising a signal variation indicating circuit means which indicates variations in the acceleration voltage of the CRT unit, characterized by a phase inverting circuit means connected to the output of the signal variation indicating circuit means and generating an output varying signal which is phase inverted in relation to the signal variations detected by the signal variation indicating circuit means; and in that the output varying signal of the phase inverting circuit means is connected directly to the voltage conducting layer of the CRT unit.

6. An arrangement according to claim 5, in which the phase inverting circuit means comprises a coupling capacitor at its output.

7. An arrangement according to claim 5, including a signal strength indicating circuit means connected to the output of the signal variation indicating circuit means and indicating the signal strength of the indicated signal variation, the output of the signal strength indicating circuit means controlling the amplification of the phase inverting circuit means.

8. An arrangement according to claim 5, in which the signal variation indicating circuit means includes a sensing means having a predetermined lower limit frequency.

\* \* \* \* \*